April 26, 1960 G. L. FOGAL 2,934,011
FIN STABILIZED PARACHUTE PACK
Filed March 29, 1957
2 Sheets-Sheet 1
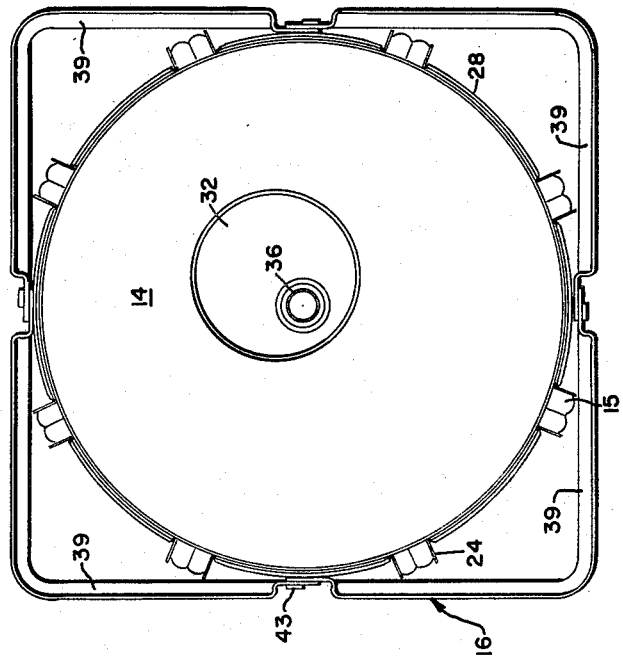
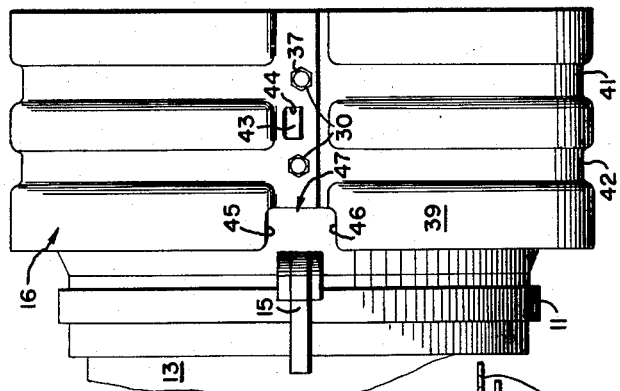
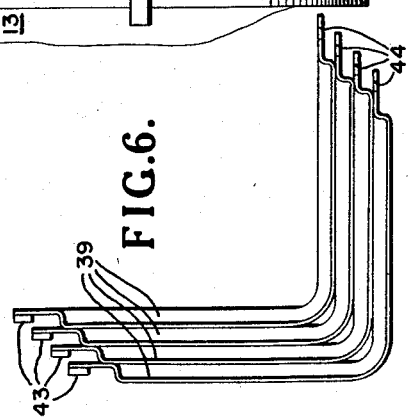
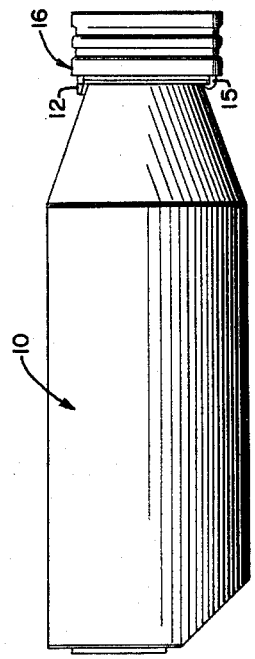
*INVENTOR.*
GORDON L. FOGAL
BY
ATTYS

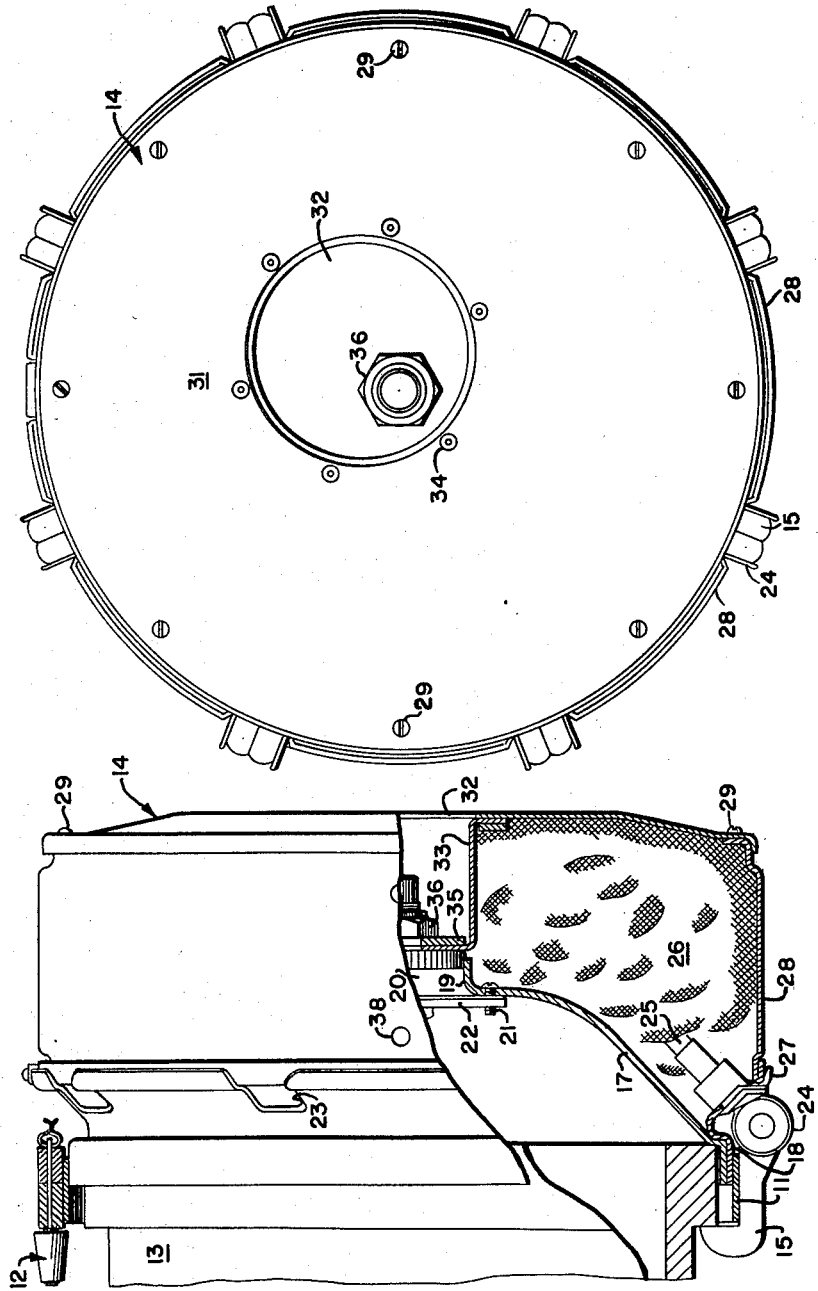

2,934,011
FIN STABILIZED PARACHUTE PACK

Gordon L. Fogal, Wayne, Pa., assignor to the United States of America as represented by the Secretary of the Navy Application March 29, 1957, Serial No. 649,578

8 Claims. (Cl. 102—4)

(Granted under Title 35, U.S. Code (1952), sec. 266)

The invention described herein may be manufactured and used by or for the Government of the United States of America for governmental purposes without the payment of any royalties thereon or therefor.

This invention relates to a parachute pack and more particularly to a pack for a parachute employed for retarding the downward movement and effecting the safe descent and landing of objects from aeronautical vehicles in which the cover for the pack is provided with means for effecting aerodynamic stabilization of the pack prior to the pack opening and the aerodynamic drag on the stabilizing means is employed to effect the ejection of the cover during the free fall of the object.

The present invention is particularly well suited for use with ordnance devices such, for example, as mines dropped from an aircraft in flight at a high launching speed.

In devices of this character heretofore devised it has been the usual practice to employ a parachute housing of some what longitudinal configuration secured to the mine or other object to be dropped from the airplane in flight within which the parachute and shroud lines are normally stowed. This housing is enclosed at the rear portion thereof by a detachable cover of generally flat or slightly dished configuration which is forcibly ejected from the housing by a compressed spring in response to a pull on a static line having one end thereof secured to the aircraft and effective to transmit a release signal to the parachute release mechanism when the parachute pack has fallen away from the aircraft at a distance sufficient to render the static line taut. In other types of parachute release mechanisms a static line is not employed, the release signal being obtained from a barometric switch when the parachute pack has descended to a predetermined altitude. Furthermore, in the use of these prior art devices it has been the general practice to employ fin structure secured to the casing of the mine or other weapon to be aerially launched.

Such prior art devices have been found to be not altogether satisfactory under the conditions of service for the reason that there is a possibility the cover ejection spring might become entangled in the parachute and thus cause a parachute failure and the stabilizing fin structure was difficult to assemble and of such configuration that it was difficult to store.

In accordance with the present invention a parachute pack structure is provided which possesses all of the advantages of the prior art devices and none of the foregoing disadvantages. This result is achieved by elimination of the cover ejecting spring and employing the aerodynamic drag on the fin structure secured to the parachute housing which is fixed to the cover and released as a unit therewith. The fin structure comprises four identical L-shaped sections secured to the parachute housing in external and tangential relation therewith, the fin structure being substantially coextensive with the longitudinal dimension of the housing and the cover. The fin sections are well adapted to be placed in mutually nesting relation prior to assembly on the housing thereby conserving storage space.

One of the objects of the present invention is to provide a new and improved parachute pack for a mine having a fin structure secured to the parachute housing for stabilizing the housing during free fall of the mine from a launching aircraft and in which the housing and fin structure is detached from the load during free downward flight.

Another object is to provide a parachute pack for a mine comprising a detachable parachute housing having a continuous stabilizing fin thereabout in which the aerodynamic drag on the fin is employed to eject the cover and housing from the load.

Still another object is to provide a new and improved fin structure for a parachute pack comprising four identical L-shaped sections adapted for nested storage prior to assembly and for tangential attachment to the exterior of a circular parachute pack in mutually interlocked relation when assembled.

Still other objects, advantages and improvements will be apparent from the following description taken in connection with the accompanying drawings of which:

Fig. 1 is a view of a marine mine employing the device of the present invention according to a preferred embodiment thereof;

Fig. 2 is an enlarged view partially in section of the parachute pack of Fig. 1 with the fin removed;

Fig. 3 is an end view of the device of Fig. 2;

Fig. 4 is an enlarged view of the fin structure assembled on the parachute housing;

Fig. 5 is an end view of the fin structure of Fig. 4 assembled on the parachute housing; and Fig. 6 is a view of the fin sections in nested relation prior to assembly on the parachute housing.

Referring now to the drawings on which like numerals of reference are employed to designate like parts throughout the several views and more particularly to Fig. 1 thereof on which is shown a mine indicated generally by the numeral 10 having a tail portion to which is detachably secured a separable ring or band 11 held together at the ends thereof by a releasable inertia device indicated generally by the numeral 12 in registered engagement with an annular member 13 secured to the tail of the mine as illustrated. A parachute pack indicated generally by the numeral 14 is retained releasably secured to the mine by a plurality of hooks 15 welded or otherwise secured at intervals to the band 11. The inertia release mechanism 12 may be of any type suitable for the purpose, such for example as the parachute release mechanism disclosed in Patent No. 2,565,470 issued August 28, 1951, to Graham B. Brown for Parachute Pack and Release Means Therefor. A fin structure indicated generally by the numeral 16 is secured to the housing of the parachute pack. In the illustrated embodiment of the invention the parachute pack comprises a base portion 17, Fig. 2, and an encircling flanged portion 18 secured to the mine as by the hooks 15 secured to the separable ring 11. The base 17 is provided with a generally centrally arranged aperture 19 within which is disposed a parachute releasing mechanism indicated generally by the numeral 20 and secured to the base 17 as by the screws 21 and mounting plate 22. The parachute release mechanism 20 may be of any type suitable for the purpose, such for example as the Parachute Release Means disclosed and claimed in the aforesaid Patent No. 2,565,470 or, if desired, the parachute release mechanism may be actuated barometrically when the mine has descended to a predetermined altitude during free fall thereof.

The flanged portion 18 is preferably provided with a plurality of outwardly extending slotted portions 23 within which are disposed a plurality of eye members 24 for establishing connections to the shroud lines 25 affixed to the parachute 26. The eye members 24 may be secured to the mine casing in any suitable manner preferably by a clevis pin structure whereby, if desired, the base 17 and flange 18 may be disconnected together with the parachute from the mine upon water entry of the mine. The specific means for unlocking the parachute cover and housing from the pack and the specific means for disconnecting the base from the mine upon entry of the mine into the water form no part of the present invention.

Fitted within a circular lip 27 formed in the flanged portion 18 of the base is a circular housing 28 secured as by the screws 29 to a cover 31 substantially as shown whereby the housing and cover are adapted to be disengaged from the base as a single unit. The cover 31 is provided with a generally centrally disposed aperture 32 in alignment with a cup-shaped member 33 secured to the cover in any suitable manner as by welding or by the screws 34 illustrated. The cup-shaped member is provided with a complementary cut-out portion for engagement with the washer 35 disposed between the bottom of the cup-shaped member and the nut 36 of the release mechanism 20 whereby the housing and cover are firmly clamped to the base portion 17 by the nut 36 until released therefrom by operation of the release mechanism 20. A parachute 26 connected as by the shroud lines 25 to the eye members 24 is stowed within the housing in such manner as to flow freely from the mine as the housing nad cover are released therefrom.

The fin structure 16 is secured to the exterior of the housing 28 by bolts 30 disposed within apertures 37 formed within the fin and complementary apertures 38 formed within the housing substantially as shown. The fin structure, when in the assembled condition, is substantially rectangular in configuration and comprises four identical sections or members 39 of L-shaped configuration and having preferably a pair of reinforcing ribs 41—42 formed thereon. Each section is provided with a raised portion 43 at one end thereof and a complementary aperture 44 formed in the other end, thereby providing a fin structure in which the ends of the sections are locked or keyed together by engagement of a raised section 43 with the aperture 44 of the adjacent section when the sections are assembled on the parachute housing to form the fin structure. Each of the sections is also provided with a cut-out portion 45 at one end thereof and a complementary cut-out portion 46 at the other end of the section thereby providing a cut-out portion indicated generally by the numeral 47 when the sections are assembled within which the eye members 24 disposed at the point of tangency of the fin with the parachute housing are arranged.

The cut-out portions 47 enable the fin to clear the circular lip 27 of flange 18 at assembly and thereby allow the fin to be wider than the circular housing 28. The aerodynamic drag of the fin as the parachute release mechanism 20 operates is sufficient, particularly at high launching speeds, to effect positive and reliable ejection of the housing and cover assembly without the necessity of employing a compression spring for this purpose. Furthermore, by securing the fin structure to the parachute pack housing, in lieu of to the trailing portion of the mine casing, increased areodynamic stability during the free-fall of the mine through the air is achieved.

On Fig. 6 is shown, for the purpose of illustration, four fin sections 39 stowed in nested relation prior to assembly thereof on the parachute pack housing. Whereas only four of these sections 39 are illustrated on Fig. 6, it will be obvious that the number of fin sections stowed in nested relation may be increased in a single nested arrangement thereby effecting a saving in stowage space.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A parachute pack for an aircraft launched mine comprising a circular base, means for securing the base to the tail portion of a mine having a longitudinal axis, a circular cup-shaped housing constructed and arranged for releasable fitting engagement with said base and of sufficient size to receive a parachute stowed therein, and fin means formed with integral ribs disposed in a plane normal to the longitudinal axis of the mine, when secured to the mine, said fin means being secured to said housing for effecting aerodynamic stability of the mine during free flight and for providing aerodynamic drag on the housing sufficient to detach the housing as the housing is released from the base.

2. A parachute pack launched mine, said mine having a longitudinal axis, comprising a cup-shaped housing having a parachute stowed therein and releasably secured to a mine, a box-like fin formed with integral ribs and disposed in a plane normal to the longitudinal axis, said box like fin encircling said housing and secured thereto for quickly separating the housing from the mine by aerodynamic drag on the fin as the housing is released from the mine.

3. An improved parachute assembly for an aircraft laid mine, said mine having a longitudinal axis, comprising a parachute pack housing of cup-shaped configuration for enclosing a parachute prior to release thereof, fin means comprising a plurality of plate members of right angular configuration having integral ribs disposed in a plane normal to the longitudinal axis of the mine when attached to the mine, means for interconnecting said plate members to provide a rectangular box-shaped fin structure, means for attaching said structure to the exterior portion of said housing thereby to effect stabilization of the mine during free flight and prior to parachute pack opening, said housing being constructed in a manner to effect the release thereof from the mine, said fin structure providing an aerodynamic drag for detachment of said housing and separation of the parachute from the mine sufficiently to cause quick opening thereof.

4. A parachute pack comprising a pair of rigid separable sections, means for releasably connecting one of said sections to a load, said load having a longitudinal axis, the other of said sections being cup-shaped, means for bringing said sections together in releasable engagement thereby to stow a parachute therein, and a box-like fin member formed with integral ribs disposed in a plane normal to the longitudinal axis of the load, said fin member encircling said cup-shaped section and carried thereby for stabilizing said load during free flight and providing an aerodynamic drag sufficient to quickly withdraw said cup-shaped section from the first mentioned section as the sections are released from each other.

5. A parachute pack according to claim 4 in which said fin member comprises four L-shaped sections secured together in end-to-end relationship.

6. A parachute pack according to claim 4 in which the section connected to the load comprises an outwardly extending lip for registered engagement with said cup-shaped section.

7. A parachute pack according to claim 6 in which said lip is provided with a plurality of slotted portions, each of said portions carrying an eye-member operatively connected to the shroud lines of the parachute and detachably secured to said load.

8. A parachute pack according to claim 7 in which the fin member is slotted to receive at least one of said eye members.

References Cited in the file of this patent

UNITED STATES PATENTS

| | | |
|---|---|---|
| 2,359,814 | Wauters | Oct. 10, 1944 |
| 2,394,897 | Cavanagh | Feb. 12, 1946 |
| 2,414,844 | Wolf | Jan. 28, 1947 |
| 2,494,885 | Lax et al. | Jan. 17, 1950 |
| 2,495,304 | Wyckoff | Jan. 24, 1950 |
| 2,565,470 | Brown | Aug. 28, 1951 |